US011236906B2

(12) United States Patent
Snyder et al.

(10) Patent No.: US 11,236,906 B2
(45) Date of Patent: Feb. 1, 2022

(54) COMBUSTOR COOLED QUENCH ZONE ARRAY

(71) Applicant: United Technologies Corporation, Farmington, CT (US)

(72) Inventors: Timothy S. Snyder, Glastonbury, CT (US); James B. Hoke, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 110 days.

(21) Appl. No.: 16/664,419

(22) Filed: Oct. 25, 2019

(65) Prior Publication Data

US 2020/0173660 A1 Jun. 4, 2020

Related U.S. Application Data

(63) Continuation of application No. 14/759,811, filed as application No. PCT/US2013/021718 on Jan. 16, 2013, now abandoned.

(51) Int. Cl.
F23R 3/00 (2006.01)
F02C 7/18 (2006.01)
F23R 3/06 (2006.01)

(52) U.S. Cl.
CPC .............. *F23R 3/005* (2013.01); *F02C 7/18* (2013.01); *F23R 3/06* (2013.01); *F23R 2900/03041* (2013.01); *F23R 2900/03042* (2013.01); *F23R 2900/03044* (2013.01); *Y02T 50/60* (2013.01)

(58) Field of Classification Search
CPC .. F02C 3/002; F02C 3/04; F02C 3/045; F02C 3/06; F02C 2900/03044; F02C 2900/03041; F02C 2900/03042; F02C 7/18; F23R 3/002; F23R 3/04; F23R 3/045; F23R 3/06; F23R 2900/03044; F23R 2900/03041; F23R 2900/03042
See application file for complete search history.

(56) References Cited

U.S. PATENT DOCUMENTS

| 4,622,821 A | 11/1986 | Madden |
| 4,653,279 A | 3/1987 | Reynolds |
| 4,720,979 A | 1/1988 | Mink |
| 4,805,397 A | 2/1989 | Barbier et al. |
| 4,875,339 A | 10/1989 | Rasmussen et al. |
| 6,145,319 A | 11/2000 | Burns et al. |
| 7,000,396 B1 | 2/2006 | Storey |
| 7,013,634 B2 | 3/2006 | Pidcock et al. |
| 7,628,020 B2 | 12/2009 | Alkabie et al. |
| 7,631,502 B2 | 12/2009 | Burd et al. |

(Continued)

FOREIGN PATENT DOCUMENTS

| EP | 2230456 A2 | 9/2010 |
| EP | 2546574 A2 | 1/2013 |

(Continued)

*Primary Examiner* — Jason H Duger
(74) *Attorney, Agent, or Firm* — Cantor Colburn LLP

(57) ABSTRACT

In accordance with one aspect of the disclosure, a combustor is disclosed. The combustor may include a shell and a liner disposed within the shell. The combustor may further include a grommet at least partially defining a hole communicating through the shell and liner and a cooling channel communicating through the grommet.

16 Claims, 4 Drawing Sheets

(56) References Cited

U.S. PATENT DOCUMENTS

| | | | |
|---|---|---|---|
| 8,479,490 B2 | 7/2013 | Zupanc et al. | |
| 9,625,151 B2 | 4/2017 | Jause et al. | |
| 2002/0189260 A1 | 12/2002 | Davis et al. | |
| 2003/0182942 A1* | 10/2003 | Gerendas | F23R 3/06 |
| | | | 60/752 |
| 2010/0236248 A1* | 9/2010 | Kaleeswaran | F23R 3/06 |
| | | | 60/752 |
| 2013/0078582 A1* | 3/2013 | Pidcock | F23R 3/06 |
| | | | 431/12 |
| 2015/0354819 A1 | 12/2015 | Snyder et al. | |

FOREIGN PATENT DOCUMENTS

| | | | | |
|---|---|---|---|---|
| FR | 2826102 A1 | 12/2002 | | |
| GB | 2353589 A | * | 2/2001 | F23R 3/08 |
| GB | 2353589 A | | 2/2001 | |
| WO | 2014112992 A1 | 7/2014 | | |

\* cited by examiner

COMBUSTOR COOLED QUENCH ZONE ARRAY

CROSS-REFERENCE TO RELATED APPLICATION

This patent application is a Continuation Application of co-pending U.S. patent application Ser. No. 14/759,811, filed on Jul. 8, 2015, which is a US National Stage under 35 U.S.C. § 371, claiming priority to International Application No. PCT/US2013/021718 filed on Jan. 16, 2013; the contents of which are all incorporated herein in their entireties.

FIELD OF THE DISCLOSURE

The present disclosure generally relates to gas turbine engines and, more specifically, to cooling of combustors in gas turbine engines.

BACKGROUND OF THE DISCLOSURE

A gas turbine engine, typically used as a source of propulsion in aircraft, operates by drawing in ambient air, combusting that air with a fuel, and then forcing the exhaust from the combustion process out of the engine. A fan on a forward end of the engine rotates to draw in ambient air. The air is then compressed by a compressor section having a low-pressure and high-pressure compressor. A portion of the compressed air is used to cool the combustor, while the rest is mixed with a fuel and ignited.

Typically, an igniter generates an electrical spark to ignite the air-fuel mixture. The products of the combustion, water, $CO_2$, NOx, and CO, then travel out of the combustor and exhaust through a turbine. The turbine section, also having a low-pressure and high-pressure turbine, is forced to rotate as the exhaust exits the engine. The turbine section and the compressor section are connected by two concentrically mounted rotating shafts running through the center of the engine. One shaft connects the low-pressure compressor and turbine, while the other shaft connects the high-pressure compressor and turbine. Thus, as the turbine section rotates from the exhaust, the compressor section rotates to bring in and compress new air. Once started, it can therefore be seen that this process is self-sustaining.

Combustors for gas turbine engines typically have an outer combustor shell and an outer liner, which may be made of a plurality of panels, disposed radially inside the outer combustor shell. Additionally, annular combustors have an inner shell and an inner liner radially outside of the inner shell. The inner and outer liners are separated by and define an annular combustion chamber. Flow cavities are typically provided between each pair of shells and liners. Cooling air is forced through these flow cavities and into the combustion chamber, creating a cooling film on hot surfaces of the liners.

The remaining portion of the compressed air is used as dilution air to fully burn all of the fuel in the combustion chamber and reduce the temperature of the exhaust. This dilution air is typically injected into a rear section of the combustion chamber through a plurality of holes defined by a plurality of grommets. In prior art designs, engines did not provide any extra cooling for such grommets, and indeed until recent improvements in the design of combustors, extra cooling was often not needed. However, as combustors have advanced, to increase engine power, the temperatures in the combustion chambers have increased. Advanced cooling for the combustor, including for the grommets, is therefore needed. If these areas are not adequately cooled, spallation of the liner, loss of combustor liner material, and cracks or other heat stress related fatigue may occur.

SUMMARY OF THE DISCLOSURE

In accordance with one aspect of the disclosure, a combustor is disclosed. The combustor may include a shell and a grommet at least partially defining a hole communicating through at least the shell, and a cooling channel communicating through the grommet.

In a refinement, the cooling channel may be oriented perpendicular to a radially inward surface of the grommet with respect to an axis of the combustor extending longitudinally through the combustor.

In another refinement, the cooling channel may be provided at a non-perpendicular angle to the radially inward surface of the grommet.

In a further refinement, the cooling channel may communicate through the grommet from a surrounding surface of the grommet oriented perpendicular to the shell of the combustor and facing away from the hole defined y the grommet to the radially inward surface of the grommet.

In another further refinement, the shell may be engaged with a radially outward surface of the grommet with respect to the axis of the combustor.

In another refinement, between six to sixteen cooling channels may communicate through the grommet.

In yet another refinement, each cooling channel may be separated by a distance about equal to three to ten times the diameter of the cooling channels.

In yet another refinement, the grommet may have a second outward surface with respect to the axis of the combustor engaged with the shell of the combustor.

In still another refinement, the grommet may be unitary with the shell and may define a hole communicating through the shell.

In still yet another refinement, the grommet may be separate from the shell and a liner of the combustor, the liner being positioned radially inside the shell with respect to the axis of the combustor, and the grommet being positioned between the shell and liner.

In accordance with another embodiment, a liner of a combustor is disclosed. The liner may include a liner panel having a hot surface and a grommet defining a hole communicating through the liner panel. The liner may further include a cooling channel communicating through the grommet.

In a refinement, the grommet may have a radially inward surface and a radially outward surface with respect to an axis extending longitudinally through the combustor, and the cooling channel may extend from the radially outward surface of the grommet to the radially inward surface of the grommet.

In another refinement, the cooling channel may be at a non-perpendicular angle to the radially inward surface of the grommet.

In a further refinement, the cooling channel may communicate through the grommet from a surrounding surface of the grommet perpendicular to the radially outward surface of the grommet and facing away from the hole defined by the grommet to the radially inward surface of the grommet.

In another refinement, between six to sixteen cooling channels may communicate through the grommet.

In yet another refinement, each cooling channel may be separated by a distance about equal to three to ten times the diameter of the cooling channels.

In yet another refinement, the grommet may be unitary with the liner panel and the radially inward surface of the grommet is the same surface as the hot surface of the liner panel.

In still yet another refinement, the grommet may be a dilution hole grommet and may define a dilution hole.

In accordance with yet another embodiment, a method of cooling a liner of a combustor is disclosed. The method may include providing a grommet with the liner of the combustor, which may at least partially define a hole through the liner panel. The method may further include directing cooling air through a cooling channel communicating through the grommet and cooling the grommet with the cooling air flowing through the cooling channel by transferring heat from the grommet to the cooling air.

In a refinement, the method may further include blowing a flame in the combustor off the inward surface of the grommet with the cooling air flowing through the cooling channel.

These and other aspects and features of the present disclosure will be better understood in light of the following detailed description when read in light of the accompanying drawings.

It should be understood that the drawings are not necessarily to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION

Figure 1:
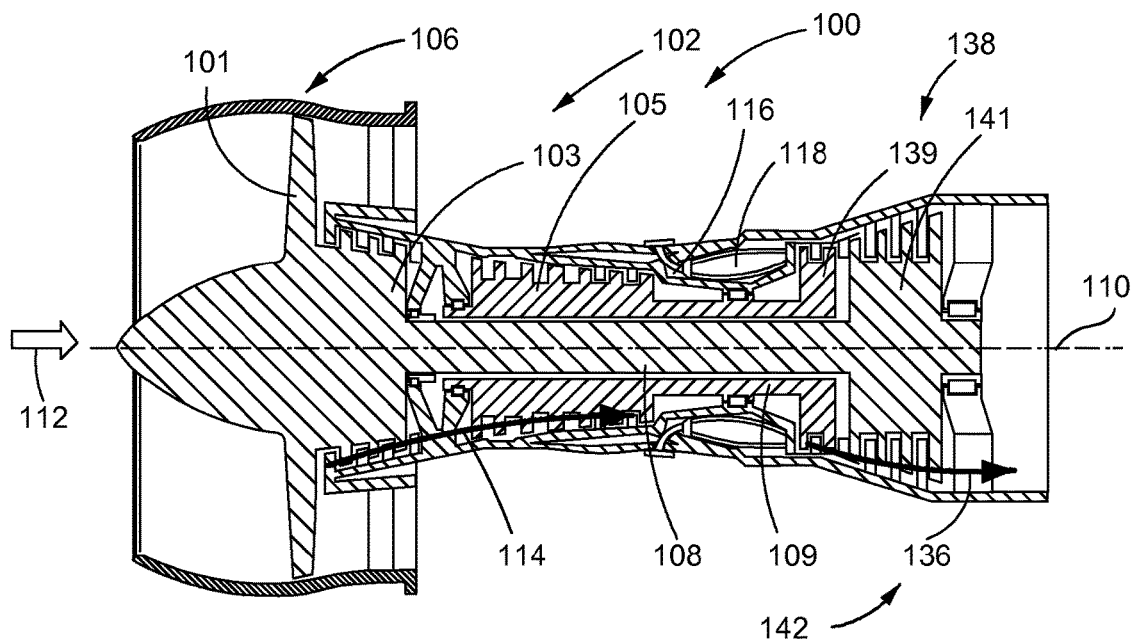
FIG. 1 is a cross section of a gas turbine engine constructed in accordance with the present disclosure.

Referring now to the drawings, and with specific reference to FIG. 1, a gas turbine engine 100 has a fan 101 and a compressor section 102 provided at a front end 106 of the engine 100. The compressor section 102, as illustrated, includes a low-pressure compressor 103 and a high-pressure compressor 105. The low-pressure compressor 103 is connected to a first shaft 108 and the high-pressure compressor 105 is connected to a second shaft 109. The second shaft 109 is concentrically mounted around the first shaft 108 and both shafts 108, 109 extend along and rotate around a central axis 110 extending longitudinally through the engine 20. When the fan 101 and compressor section 102 rotate, the fan 101 draws ambient air 112 into the engine 100, and the compressor section 102 compresses the ambient air 110. The compressed air 114 may be forced through a diffuser 116 to a combustor 118. At the combustor 118, the compressed air 114 is split to be used in multiple ways.

The combustor 118 has a shell 132 and may include a liner 130 mounted to the shell 132. In the annular combustor illustrated in FIG. 2, the combustor 118 has an outer and inner set of shells and liners with respect to the central axis 110 that cooperate to define and are separated by an annular combustion chamber 135. A combustor axis 119 extends the longitudinally through the combustor 118 equidistant from the outer and inner shells 132. The shell 132 and associated liner 130 are separated by and define a flow cavity 170 therebetween. Some of the compressed air 114 may pass through a swirler 124 into the combustion chamber 135 as combustion air 122. The swirler 124 may create turbulence in the combustion air 122 which mixes the combustion air 122 and a fuel 126 entering the combustion chamber 135 by a fuel injector 128. The air-fuel mixture may then be ignited by an igniter 129 projecting through the liner 130 and shell 132 of the combustor 118. The combustion products may then be ejected from the combustion chamber 135 as exhaust 136. As shown in FIG. 1, the exhaust 136 passes through a turbine section 138, having a high-pressure turbine 139 and a low pressure turbine 141, before exiting the engine 100. The high-pressure turbine 139 is also connected to the second shaft 109 and the low-pressure turbine 141 is connected to the first shaft 108 such that when the turbine section 138 is rotated by the kinetic energy of the exhaust 136, the shafts 108 and 109, and thus the compressor section 102, are rotated about the central axis 110. Thereby the process may draw in more ambient air 112 as the exhaust 136 exits the engine 20 and may be self-sustaining once it has begun.

The compressed air 114 not entering through the swirlers 124 as combustion air 122 may be used as cooling air 144 and dilution air 146. The cooling air 144 flows through a plurality of impingement holes 172 communicating through the shell 132 into the flow cavity 170 and through a plurality of effusion holes 174 communicating through the liner 130 into the combustion chamber 135. The dilution air 146, on the other hand, may enter the combustion chamber 135 at a rear section 148 through at least one dilution hole 150 communicating through the liner 130 and shell 132. In some embodiments at least one dilution hole 150 communicates through the liner 130 and shell 132 in a forward section 152 of the combustion chamber 135. The dilution air 146 is burnt in the combustion chamber 135 to complete the combustion process. Additionally, the dilution air 146 may reduce the temperature of the exhaust 136 before the exhaust 136 reaches the turbine section 138.

Figure 2:
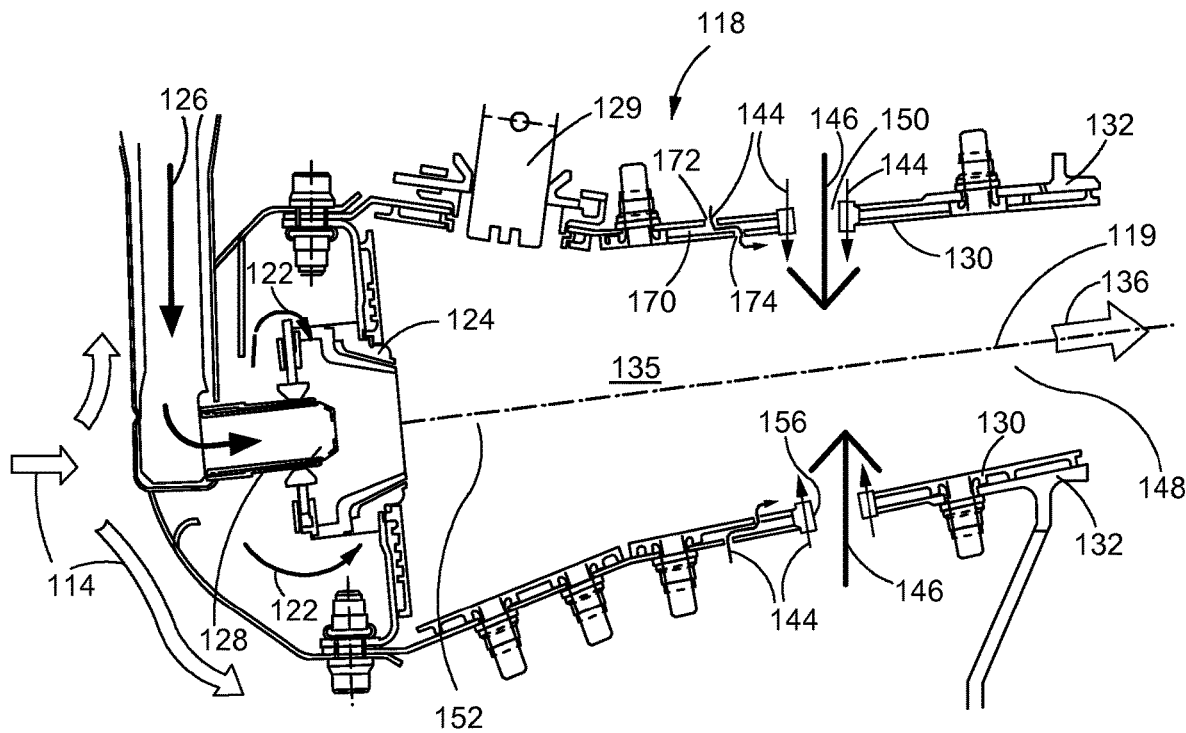
FIG. 2 is a partial cross section of an annular combustor of a gas turbine engine constructed in accordance with a first embodiment of the present disclosure.
Figure 3:
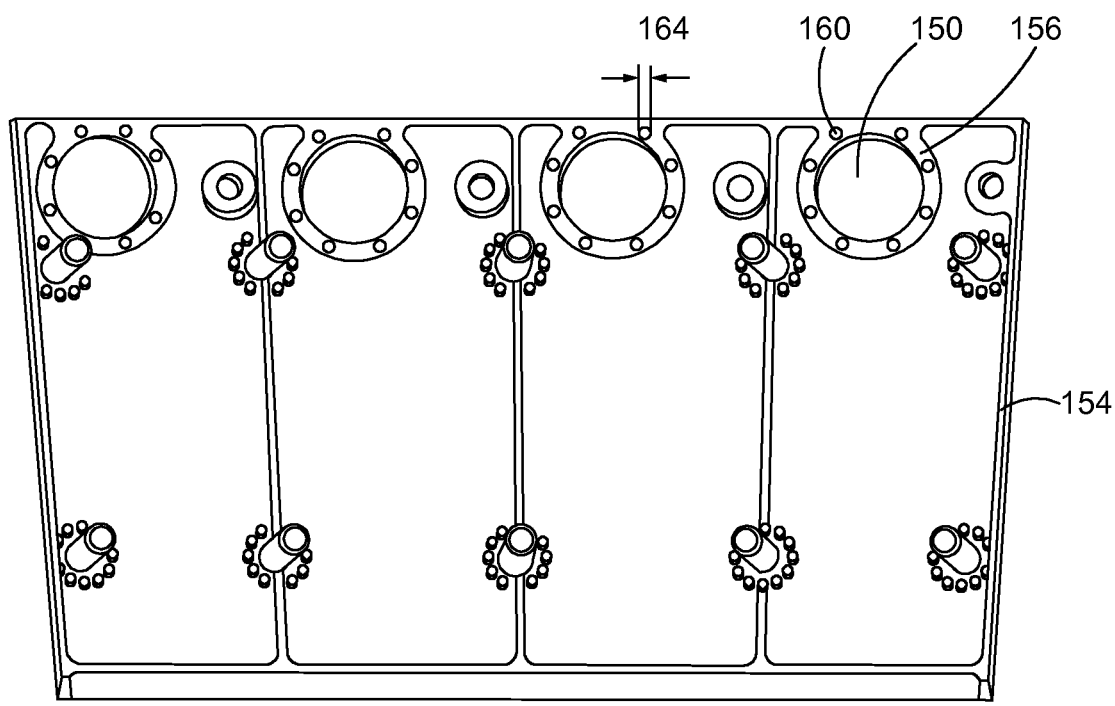
FIG. 3 is a plan view of a liner panel of a combustor constructed in accordance with a second embodiment of the present disclosure.

In one embodiment, as illustrated in FIG. 3, the liner 130 may be made up of a plurality of panels 154. Each of the panels 154 may have at least one dilution hole 150 defined by a generally cylindrical dilution hole grommet 156. The grommet 156 may be unitary with the liner 130 such as the raised platform illustrated in FIGS. 3 and 6-8, or a separate element of the combustor 118 but in engagement with and positioned between the liner 130 and shell 132 of the combustor 118 as illustrated in FIGS. 2, 4, and 5.

Figure 4:
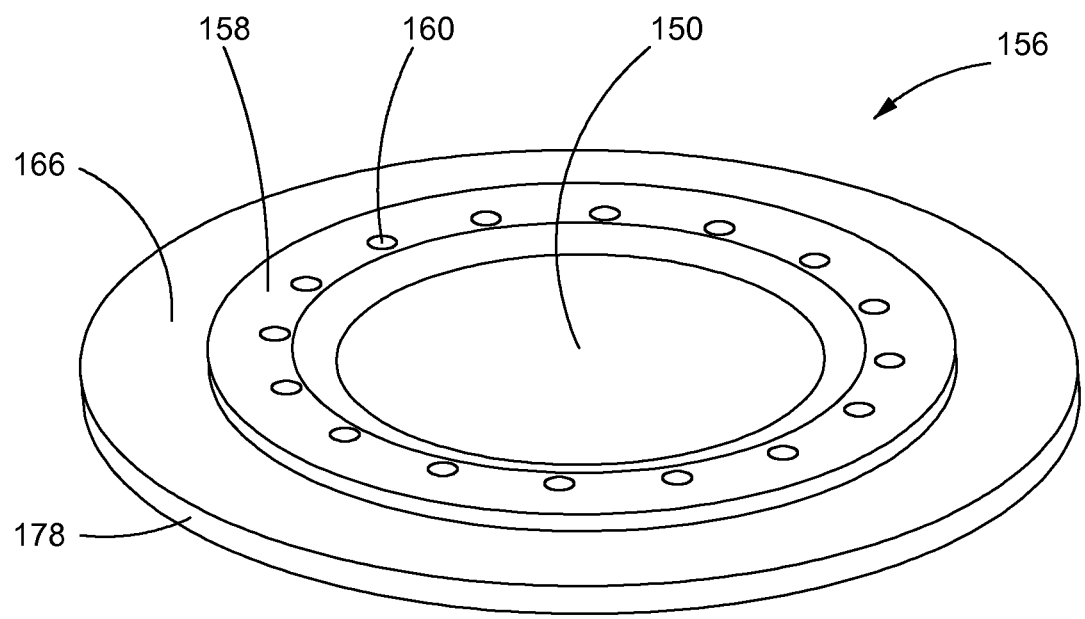
FIG. 4 is a perspective view of the grommet of FIG. 2.
Figure 5:
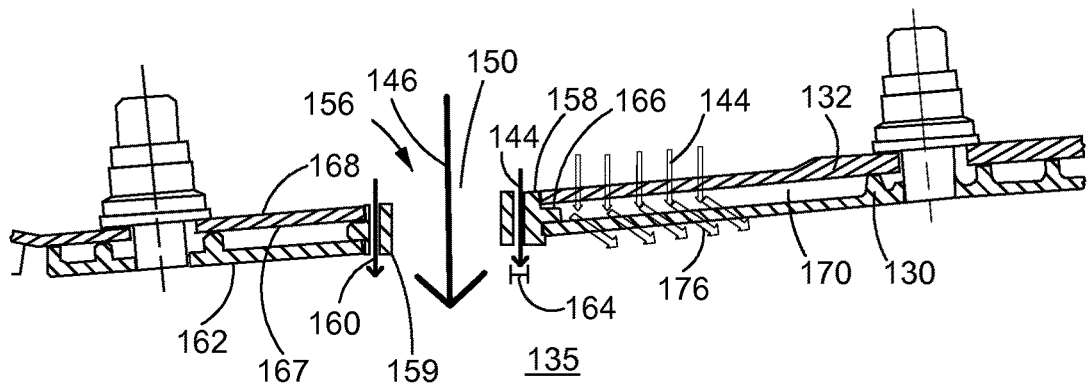
FIG. 5 is a cross section of a liner and a corresponding shell of the combustor of FIG. 2.

Speaking now to the embodiment illustrated in FIGS. 2, 4, and 5, the grommet 156 is a separate element of the combustor engaged with and positioned between the shell 132 and liner 130 of the combustor 118. The grommet 156 has a radially outward surface 158 with respect to the combustor axis 119 and at least one cooling channel 160 communicating through the grommet 156 from the outward surface 158 to an opposing radially inward surface 159 of the grommet 156 still with respect to the combustor axis 119. The radially inward surface 159 may be flush with a hot surface 162 of the liner 130.

Turning now to embodiments where the grommet 156 is unitary with the liner 130, such as illustrated in FIGS. 3 and 6-8. The cooling channels 160 communicate through the grommet 156, or in these embodiments the raised platform that will herein after be referred to simply as the grommet 156, to the hot surface 162 of the liner 130. For all purposes herein, the inward surface 159 of a grommet 156 which is separate from the liner 130 is equivalent to the hot surface 162 of the liner 130 when the grommet 156 is unitary with the liner 130.

While ten cooling channels 160 are shown in each grommet 156 in FIG. 3, in other embodiments between six and sixteen cooling channels 160 may be provided in the grommet 156 to provide various amounts of cooling air 144 to the radially inward surface 159 of the grommet 156 and/or the hot surface 162 of the liner 130. However, any number of cooling channels 160 may communicate through the grommet 156 to provide any desired amount of cooling air 144 to the radially inward surface 159 and/or hot surface 162. In another exemplary embodiment, each of the cooling channels 160 are separated by a distance about equal to three to ten times the diameter 164 of the cooling channels 160 to provide an even distribution of the cooling air 144 on the radially inward surface 159 and/or hot surface 162. In other embodiments, however, the cooling channels 160 may be separated by any desired distance to provide any desired distribution or concentration of cooling air 144 on the radially inward surface 159 and/or hot surface 162.

Figure 6:
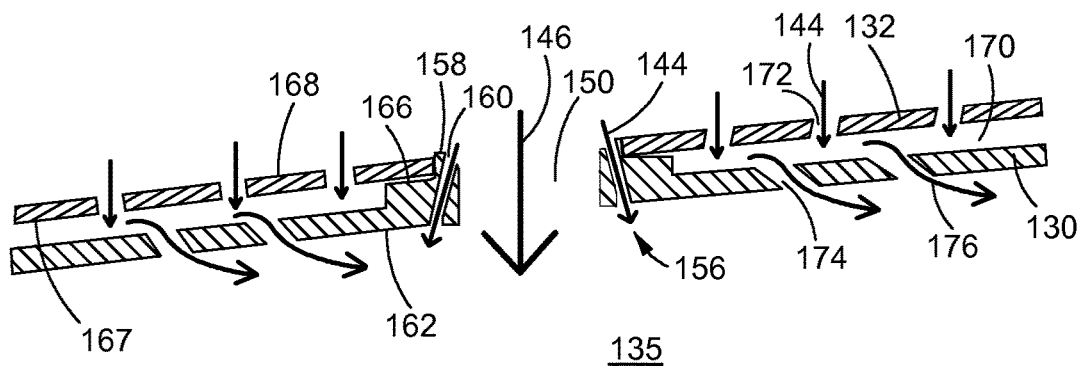
FIG. 6 is a cross-sectional view of a liner and shell of a combustor constructed in accordance with a third embodiment of the present disclosure.
Figure 7:
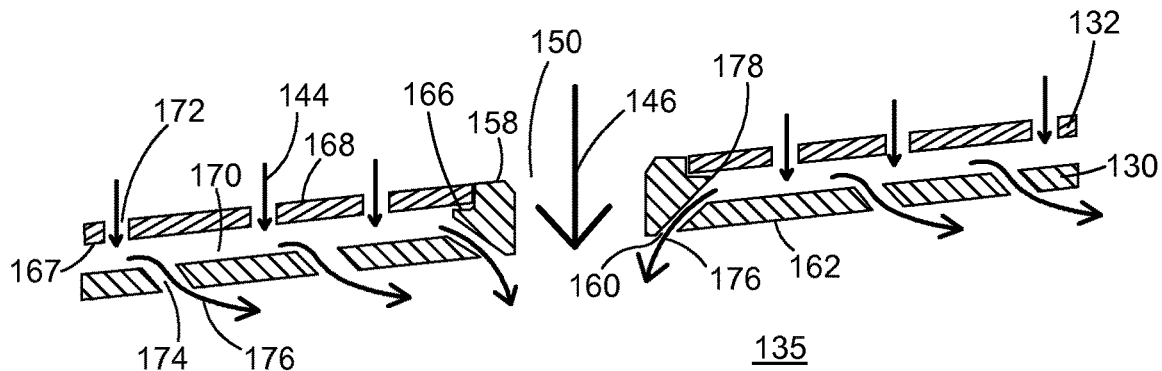
FIG. 7 is a cross section of a liner and shell of a combustor constructed in accordance with a fourth embodiment of the present disclosure.

In some embodiments, the grommet 156 may have a second radially outward surface 166 with respect to the combustor axis 119, which is engaged to an interior surface 167 of the shell 132 still with respect to the combustor axis 119, as seen in FIGS. 5-7. Such engagement of the surfaces 166 and 167 prevent compressed air 114 from passing between the grommet 156 and shell 132 to enter the flow cavity 170. The first radially outward surface 158 of the grommet 156 may be flush with an exterior surface 168 of the shell 132 with respect to the combustor axis 119, as illustrated in FIGS. 5-7, or may extend further radially outwards than the shell 132.

As illustrated in FIGS. 6 and 7 the cooling channels 160 may be oriented at a non-perpendicular angle to the radially outward surface 158 of the grommet 156. Specifically, in FIG. 7 the cooling channels 160 communicate from a generally cylindrical surrounding surface 178 of the grommet to the hot surface 162 of the liner 130. The surrounding surface 178 is oriented perpendicular to the radially outward surface 159 and faces away from the dilution hole 150 that is defined by the grommet 156. Such non-perpendicular cooling channels 160 may also be implemented in grommets 156 which are not unitary with the liner 130.

Figure 8:
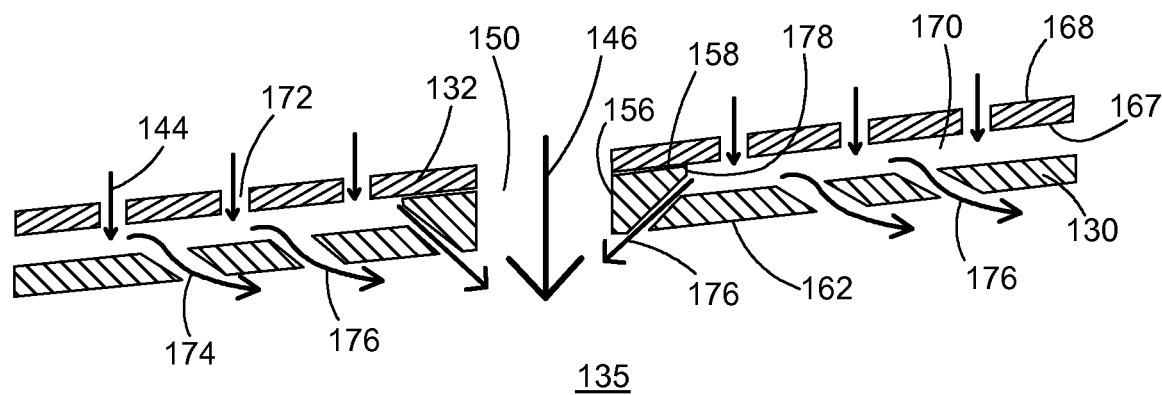
FIG. 8 is a cross section of a liner and shell of a combustor constructed in accordance with a fifth embodiment of the present disclosure.

In another embodiment, as can be seen in FIG. 8, the grommet 156 may only have a first radially outward surface 159 and not have a second radially outward surface 166. In this embodiment, the first radially outward surface 159 is engaged with the shell 132 such that no compressed air 114 may flow between the shell 132 and the grommet 156. The cooling channels 160 of this embodiment communicate from the surrounding surface 178 of the grommet 156 to the hot surface 162 of the liner. As stated before, the cooling channels 160 described above may also be implemented in grommets 156 that are not unitary with the liner 130.

Figure 9:
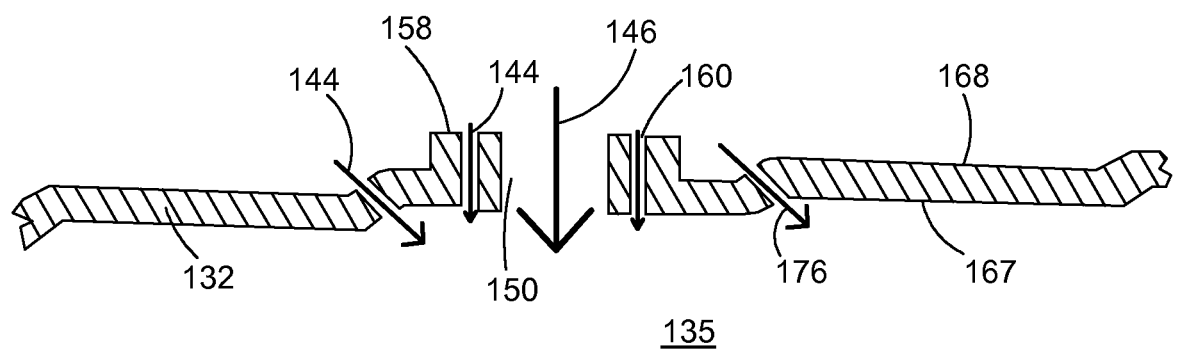
FIG. 9 is a cross section of a shell of a single walled combustor constructed in accordance with a sixth embodiment of the present disclosure.

In combustors 118 which have no liner 130 but only a shell 132, such as in a can combustor or a single wall annular combustor as illustrated in FIG. 9 for example, at least one dilution hole 150 may communicate through the shell 132 of the combustor 118 and be defined by the grommet 156 that, in this embodiment, is unitary with the shell 132. At least one cooling channel 160 communicates through the unitary grommet 156 and shell 132 to provide a path for cooling air 144 to flow into the combustion chamber 135.

The cooling air 144 flowing through the cooling channels 160 described above and illustrated in FIGS. 2-9 cool the grommets 156, be they unitary with the shell 132, liner 130, or separate from both, by transferring heat from the grommet 156 to the cooling air 144.

INDUSTRIAL APPLICABILITY

From the foregoing, it can be seen that the technology disclosed herein has industrial applicability in a variety of settings such as, but not limited to, cooling dilution hole grommets and the liner around dilution holes (or other holes) in combustors of gas turbine engines. Such engines may be used, for example, in aircraft to generate thrust or in land-based applications to generate power. This improvement over prior art reduces the temperature of the combustor liner around the dilution holes. The reduction in temperature makes the liner less susceptible to damage by heat during engine operations. Such damage may include spallation of the combustor liner, loss of combustor liner material, and cracks or other heat stress related fatigue in the combustor liner.

While the present disclosure has been in reference to dilution hole grommets, a gas turbine engine, and an aircraft, one skilled in the art will understand that the teachings herein can be used in other applications as well such as, but not limited to, with igniter hole grommets. It is therefore intended that the scope of the invention not be limited by the embodiments presented herein as the best mode for carrying out the invention, but that the invention will include all embodiments falling within the scope of the claims.

What is claimed is:

1. A combustor for a gas turbine engine, comprising:
   a shell having a plurality of impingement holes;
   a panel mounted to the shell, the panel having a hot surface defining a portion of a combustion chamber, the panel having a plurality of effusion holes, wherein a flow cavity is defined between the shell and the panel and a flow of air passes through the plurality of impingement holes, into the flow cavity, and into the combustion chamber through the plurality of effusion holes; and
   a grommet integrally formed with the panel and at least partially defining a hole communicating through at least the shell, the grommet including at least one cooling channel communicating through the grommet and arranged about the hole, wherein the grommet comprises:
   an outward surface arranged proximate the shell;
   an engagement surface configured to engage with the shell to prevent air from the hole defined by the grommet from passing between the grommet and the shell to enter the flow cavity;

an inward surface defined flush with the hot surface of the panel and defining a portion of the hot surface of the panel; and the at least one cooling channel passes from the outward surface through the material of the grommet from the outward surface to the inward surface.

2. The combustor of claim 1, wherein the at least one cooling channel is oriented perpendicular to the inward surface of the grommet with respect to an axis extending longitudinally through the combustion chamber.

3. The combustor of claim 1, wherein the at least one cooling channel is provided at a non-perpendicular angle to the inward surface of the grommet.

4. The combustor of claim 1, wherein the at least one cooling channel comprises between six and sixteen cooling channels that communicate through the grommet.

5. The combustor of claim 1, wherein the at least one cooling channel is a plurality of cooling channels that are arranged circumferentially around the hole defined by the grommet.

6. The combustor of claim 1, wherein the at least one cooling channel is a plurality of cooling channels and each cooling channel is separated about a circumference of the grommet by a distance three to ten times a diameter of one cooling channel of the plurality of cooling channels.

7. The combustor of claim 1, wherein the hole defined by the grommet is a dilution hole.

8. The combustor of claim 1, wherein the at least one cooling channel is oriented such that a flow passing through the at least one cooling channel will prevent a flame within the combustion chamber from contacting the inward surface of the grommet.

9. A method of cooling a portion of a combustor of a gas turbine engine, the method comprising:

providing a grommet that is integrally formed with a panel that is mounted to a shell of the combustor, wherein the shell includes a plurality of impingement holes, wherein the panel has a hot surface that defines a portion of a combustion chamber, the panel having a plurality of effusion holes, wherein a flow cavity is defined between the shell and the panel and a flow of air passes through the plurality of impingement holes, into the flow cavity, and into the combustion chamber through the plurality of effusion holes, the grommet at least partially defining a hole through the panel and the shell, the grommet including at least one cooling channel that passes from an outward surface of the grommet through the material of the grommet to an inward surface thereof, wherein the inward surface of the grommet is flush with the hot surface of the panel and defines a portion of the hot surface of the panel and wherein the at least one cooling channel is arranged proximate the hole, the grommet including an engagement surface configured to engage with the shell to prevent air from the hole defined by the grommet from passing between the grommet and the shell to enter the flow cavity;

directing cooling air through the at least one cooling channel communicating through the grommet; and cooling the grommet with the cooling air flowing through the at least one cooling channel by transferring heat from the grommet to the cooling air.

10. The method of claim 9, further comprising blowing a flame in the combustion chamber off the inward surface of the grommet with the cooling air flowing through the at least one cooling channel.

11. The method of claim 9, wherein the at least one cooling channel is oriented perpendicular to the inward surface of the grommet with respect to an axis extending longitudinally through the combustion chamber.

12. The method of claim 9, wherein the at least one cooling channel is provided at a non-perpendicular angle to the inward surface of the grommet.

13. The method of claim 9, wherein the at least one cooling channel comprises between six and sixteen cooling channels that communicate through the grommet.

14. The method of claim 9, wherein the at least one cooling channel is a plurality of cooling channels that are arranged circumferentially around the hole defined by the grommet.

15. The method of claim 9, wherein the at least one cooling channel is a plurality of cooling channels and each cooling channel is separated about a circumference of the grommet by a distance three to ten times a diameter of one cooling channel of the plurality of cooling channels.

16. The method of claim 9, wherein the at least one cooling channel is oriented such that a flow passing through the at least one cooling channel will prevent a flame within the combustion chamber from contacting the inward surface of the grommet.

* * * * *